(12) United States Patent
Eftimovski et al.

(10) Patent No.: US 11,729,610 B2
(45) Date of Patent: *Aug. 15, 2023

(54) SYSTEM, METHOD, AND APPARATUS FOR SECURE TELEMATICS COMMUNICATION

(71) Applicant: Cummins, Inc., Columbus, IN (US)

(72) Inventors: Gorance V. Eftimovski, Columbus, IN (US); Troy D. Hamilton, Columbus, IN (US); Tomas Lopez Lauterio, Columbus, IN (US); Michael F. Mattern, Columbus, IN (US); Thomas J. Milvert, Columbus, IN (US); Srikanth Namuduri, Columbus, IN (US); Prasanna Srinivasan, Columbus, IN (US); Ankit R. Tarkas, Columbus, IN (US); Sagar R. Uplenchwar, Columbus, IN (US); Jaydeep J. Das, Pune (IN); Sharika K. Kumar, Columbus, IN (US); Scott David Richter, Columbus, IN (US)

(73) Assignee: Cummins Inc., Columbus, IN (US)

( * ) Notice: Subject to any disclaimer, the term of this patent is extended or adjusted under 35 U.S.C. 154(b) by 250 days.

This patent is subject to a terminal disclaimer.

(21) Appl. No.: 17/093,187

(22) Filed: Nov. 9, 2020

(65) Prior Publication Data

US 2021/0058777 A1 Feb. 25, 2021

Related U.S. Application Data

(63) Continuation of application No. 15/763,246, filed as application No. PCT/US2016/053755 on Sep. 26, 2016, now Pat. No. 10,834,582.

(30) Foreign Application Priority Data

Sep. 30, 2015 (IN) .......................... 5221/CHE/2015

(51) Int. Cl.
*H04L 29/06* (2006.01)
*H04W 12/02* (2009.01)
(Continued)

(52) U.S. Cl.
CPC ............ *H04W 12/02* (2013.01); *G07C 5/008* (2013.01); *H04L 9/0819* (2013.01);
(Continued)

(58) Field of Classification Search
CPC ... H04W 12/02; H04W 4/48; H04W 12/0471; H04W 12/041; H04W 12/033;
(Continued)

(56) References Cited

U.S. PATENT DOCUMENTS 6,148,404 A * 11/2000 Yatsukawa ............ H04L 9/0869
726/2
7,236,783 B2 6/2007 Gould
(Continued)

OTHER PUBLICATIONS

Chechoway,"Comprehensive Experimental Analyses of Automotive Attack Surfaces", 2011, pp. 1-16 (Year: 2011).*
(Continued)

*Primary Examiner* — Noura Zoubair
*Assistant Examiner* — Gregory A Lane
(74) *Attorney, Agent, or Firm* — Foley & Lardner LLP (57) ABSTRACT

A method includes receiving registration information regarding a telematics unit and a respective control system for a plurality of equipment pieces; receiving a seed from a control system of a first equipment piece via a telematics unit of the first equipment piece based on receiving a telematics session request by the control system of the first equipment piece; authenticating the telematics unit and the control system of the first equipment piece based on information included with the seed and the registration information; generating a first encrypted key and a second encrypted
(Continued)

key based on the authentication; providing the first key to the telematics unit for the first equipment piece; and providing the second encrypted key to the control system of the first equipment piece via the telematics unit of the first equipment piece to establish a data communication channel.

20 Claims, 4 Drawing Sheets (51) Int. Cl.
| | |
|---|---|
| *H04W 4/021* | (2018.01) |
| *H04W 4/48* | (2018.01) |
| *H04W 12/06* | (2021.01) |
| *H04W 12/033* | (2021.01) |
| *H04W 12/041* | (2021.01) |
| *H04W 12/0471* | (2021.01) |
| *G07C 5/00* | (2006.01) |
| *H04L 9/08* | (2006.01) |
| *H04L 9/40* | (2022.01) |
| *H04L 67/12* | (2022.01) |
| *H04W 4/40* | (2018.01) |

(52) U.S. Cl.
CPC .......... *H04L 9/0869* (2013.01); *H04L 9/0891* (2013.01); *H04L 63/0428* (2013.01); *H04L 67/12* (2013.01); *H04W 4/021* (2013.01); *H04W 4/48* (2018.02); *H04W 12/033* (2021.01); *H04W 12/041* (2021.01); *H04W 12/0471* (2021.01); *H04W 12/06* (2013.01); *H04L 2209/80* (2013.01); *H04L 2209/84* (2013.01); *H04W 4/40* (2018.02)

(58) Field of Classification Search
CPC ....... H04W 4/021; H04W 12/06; H04W 4/40; G07C 5/008; H04L 9/0819; H04L 9/0869; H04L 9/0891; H04L 63/0428; H04L 67/12; H04L 2209/80; H04L 2209/84

USPC .......................................................... 713/171
See application file for complete search history.

(56) References Cited

U.S. PATENT DOCUMENTS

| | | | |
|---|---|---|---|
| 7,506,309 B2 | 3/2009 | Schaefer | |
| 8,126,145 B1 | 2/2012 | Tewari et al. | |
| 8,143,994 B2 | 3/2012 | Jung | |
| 8,549,298 B2 * | 10/2013 | Rouskov | H04L 9/3213 713/173 |
| 8,761,390 B2 | 6/2014 | Peirce et al. | |
| 9,654,469 B1 | 5/2017 | Yang | |
| 2005/0264404 A1 * | 12/2005 | Franczyk | G08G 1/096791 340/936 |
| 2009/0119657 A1 | 5/2009 | Link, II | |
| 2010/0058053 A1 | 3/2010 | Wood et al. | |
| 2011/0154022 A1 * | 6/2011 | Cheng | H04L 63/062 713/153 |
| 2011/0320089 A1 | 12/2011 | Lewis | |
| 2012/0254948 A1 * | 10/2012 | Kleve | H04L 9/3215 726/4 |
| 2014/0003606 A1 * | 1/2014 | Birnbaum | H04W 48/04 455/456.2 |
| 2014/0033293 A1 | 1/2014 | Kennedy | |
| 2014/0169564 A1 | 6/2014 | Gautama et al. | |
| 2014/0270158 A1 | 9/2014 | Peirce | |
| 2015/0113627 A1 * | 4/2015 | Curtis | H04L 63/08 726/10 |
| 2016/0065550 A1 * | 3/2016 | Kanov | H04W 12/04 726/7 |
| 2017/0041147 A1 | 2/2017 | Krahn et al. | |

OTHER PUBLICATIONS

International Search Report and Written Opinion for International Application No. PCT/US2016/053755, dated Dec. 15, 2016, 9 pages.
Raya, "Securing Vehicular Communications", Oct. 2006, IEEE, pp. 8-14.

* cited by examiner

SYSTEM, METHOD, AND APPARATUS FOR SECURE TELEMATICS COMMUNICATION

CROSS-REFERENCE TO RELATED APPLICATIONS

This application is continuation of U.S. patent application Ser. No. 15/763,246 filed on Mar. 26, 2018, which is a national phase application of International Application No. PCT/US2016/053755 filed on Sep. 26, 2016, which in turn claims the benefit of and priority to Indian Patent Application No. 5221/CHE/2015, filed on Sep. 30, 2015, which are all incorporated herein by reference in their entireties.

BACKGROUND

Telematics refers to the combination of communications with information processing that is applicable in many fields, such as vehicles. Typically, vehicular telematics include a third-party's telematics box communicably coupled to the control system of the vehicle. The third-party's telematics box receives non-confidential or public data from the control system, provides the non-confidential information to their own platform (e.g., cloud or other computing location), and may eventually provide the public data to the control system's provider/manufacturer based on one or more agreements. While the control system may have access to both private (i.e., confidential data) and public data, the control system is configured to prevent dissemination of said private data to, for example, third parties such as providers of the telematics units. While the transmission of public data may provide insight into some data points of interest, the control system provider/manufacturer or customers thereof may desire the private data for various purposes (e.g., remote diagnostics, etc.). Accordingly, a need exists for secure telematics communication between the control system provider/manufacturer via the third party telematics box providers for the transmission of said proprietary data.

SUMMARY

Various embodiments disclosed herein relate to the establishment, management, and facilitation of secure telematics communication among a vehicular control system, a remote operator of the vehicular control system, and a telematics box.

One embodiment relates to an apparatus. The apparatus includes a registration module structured to receive registration information regarding a telematics unit and a control system for a piece of equipment; a seed module structured to receive a seed from the control system via the telematics unit responsive to reception of a telematics session request by the control system, wherein the seed module is structured to authenticate the telematics unit and the control system for the piece of equipment based on information included with the seed; and a secure communication module structured to generate an encrypted key responsive to the authentication and provide the encrypted key to the control system via the telematics unit to establish a proprietary data communication channel from the control system to the apparatus via the telematics unit. In one embodiment, the piece of equipment is configured as a vehicle.

Another embodiment relates to a telematics environment. The telematics environment includes a plurality of equipment pieces with each equipment piece having a control system and a telematics unit communicably coupled to the control system, and a controller communicably coupled to the telematics unit for each equipment piece. The controller is structured to: receive registration information regarding the telematics unit and the control system for each equipment piece; receive a seed from the control system via the telematics unit responsive to reception of a telematics session request by the control system for a particular equipment piece of the plurality of equipment pieces; authenticate the telematics unit and the control system for the particular equipment piece based on information included with the seed; generate an encrypted key responsive to the authentication; and provide the encrypted key to the control system via the telematics unit to establish a proprietary data communication channel from the control system to the controller via the telematics unit for the particular equipment piece.

Still another embodiment relates to a method. The method includes receiving, by a processing circuit, registration information regarding a telematics unit and a control system for each equipment piece in a plurality of equipment pieces; receiving, by the processing circuit, a seed from a control system via a telematics unit for a particular equipment piece in the plurality of equipment pieces responsive to reception of a telematics session request by the control system for the particular equipment piece of the plurality of equipment pieces; authenticating, by the processing circuit, the telematics unit and the control system for the particular equipment piece based on information included with the seed and the registration information; generating, by the processing circuit, an encrypted key responsive to the authentication; and providing, by the processing circuit, the encrypted key to the control system via the telematics unit to establish a proprietary data communication channel from the control system to the processing circuit via the telematics unit for the particular equipment piece.

These and other features, together with the organization and manner of operation thereof, will become apparent from the following detailed description when taken in conjunction with the accompanying drawings.

DESCRIPTION OF ILLUSTRATIVE EMBODIMENTS

For the purposes of promoting an understanding of the principles of the disclosure, reference will now be made to the embodiments illustrated in the drawings and specific language will be used to describe the same. It will nevertheless be understood that no limitation of the scope of the disclosure is thereby intended, any alterations and further modifications in the illustrated embodiments, and any further applications of the principles of the disclosure as illustrated therein as would normally occur to one skilled in the art to which the disclosure relates are contemplated herein.

Referring to the Figures generally, the various systems, methods, and apparatuses provided herein relate to the establishment of a secure telematics communication session. Conventional vehicles include one or more control systems for controlling various components (e.g., fueling actuators, etc.). However, the control systems are not provided with external communication means to communicate with remote devices. Accordingly, telematics units are configured to communicate with a remote device (e.g., the telematics unit manufacturer's own platform, such as remote server or monitor). The telematics units are adapted for reception and communicative coupling with the control system(s) of the vehicle. However, telematics units providers are typically third-parties relative to the vehicle and/or control system manufacturers. As such, only certain—non-confidential—pieces of data are permissibly communicated from the control system to the telematics unit to an end destination. According to the present disclosure, a telematics environment generally includes a telematics system communicably coupled to a telematics unit of the vehicle. The telematics system is structured to dynamically authenticate the telematics unit and control system of the vehicle and provide at least one encrypted key responsive to the authentication. The at least one encrypted key defines the capabilities of the telematics session (e.g., duration, what is transmitted, etc.) and ensures or substantially ensures that proprietary data may be sent through the telematics unit via encryption of the at least one key. In this regard, both proprietary and public data may be delivered to an end destination (e.g., a telematics cloud of the control system manufacturer) with little risk of compromise of the data (e.g., access) by the telematics unit or provider thereof. This secure telematics communication session can provide capabilities and features, such as the ability to run a diagnostic session, read/write propriety data to the control system (e.g., engineering parameters), etc., that are missing in conventional telematics environments. These and other features of the present disclosure are described more fully herein.

Figure 1:
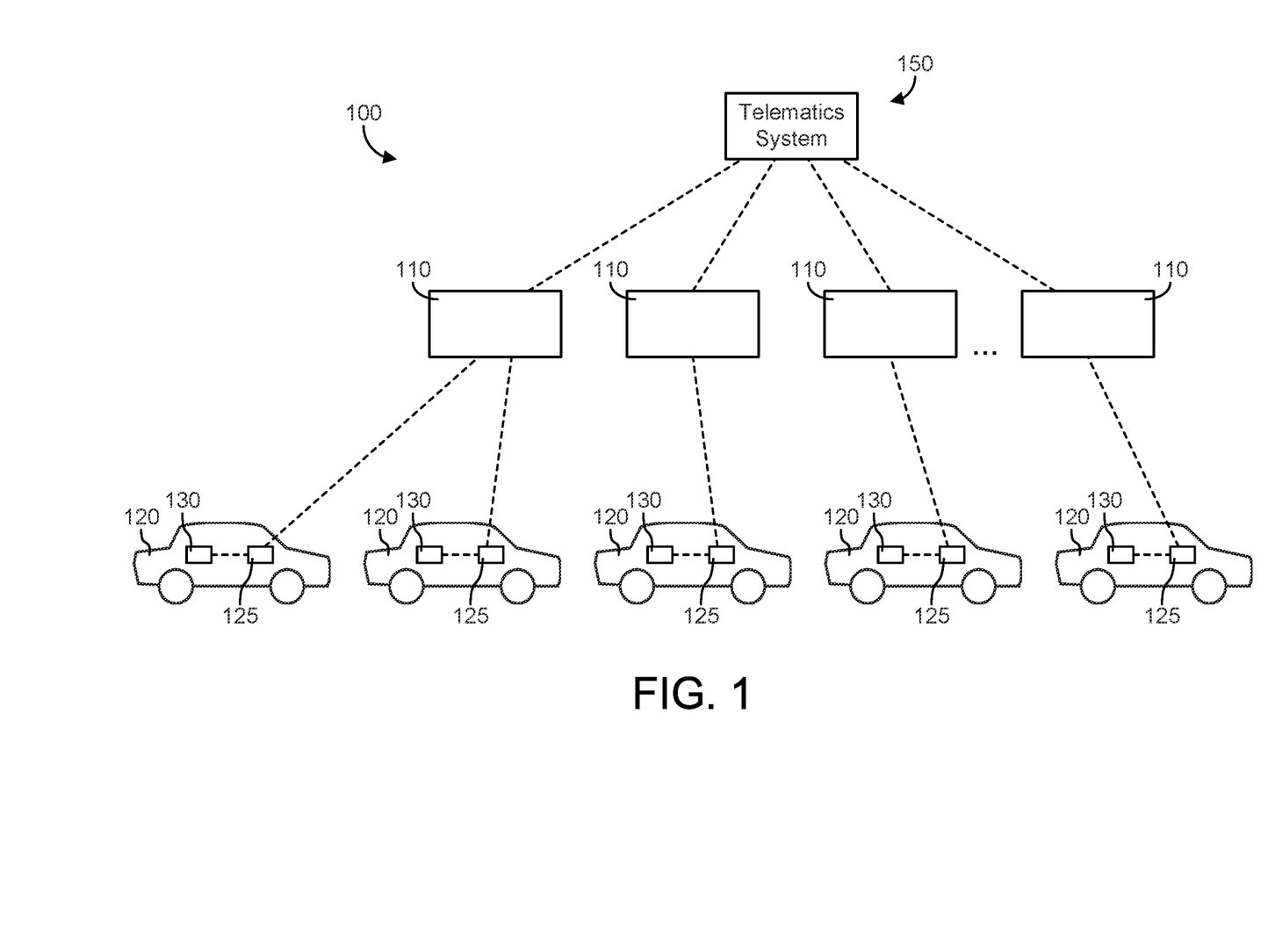
FIG. 1 is a schematic diagram of a telematics environment with a plurality of vehicles communicably coupled to a telematics system, according to an example embodiment.

Referring now to FIG. 1, a schematic diagram of a telematics environment 100 is shown according to one embodiment. The telematics environment 100 is structured to facilitate and provide the exchange of information or data via a telematics system 150 and one or more pieces of equipment. In the example of FIG. 1, the equipment is shown as vehicles 120 that each include one or more control systems 130. However, in other embodiments, the equipment may be configured as a stationary application, such as a power generator. In still other embodiments, the equipment may include, but is not limited to, on-highway vehicles (e.g., trucks, buses, etc.), off-highway vehicles (e.g., four-wheelers and ATVs, tractors, lawn mowers, snowmobiles, etc.), marine vessels (e.g., ships, submarines, boats, yachts, cruise ships, etc.), construction equipment (e.g., concrete trucks, hand-operated tools, loaders, boom lifts, etc.), mining equipment (e.g., mobile mining crushers, dozers, loaders, etc.), oil and gas equipment (e.g., drilling apparatuses, dozers, loaders, rigs, etc.), and so on. Accordingly, the vehicle depiction and description contained herein is not meant to be limiting as other types of equipment may be used with the telematics system 150. Further, it should be understood that the aforementioned equipment list is not meant to be limiting or exhaustive as the present disclosure contemplates other types of equipment intended to fall within the spirit and scope of the present disclosure.

As shown and generally speaking in regard to this example embodiment, the telematics environment 100 includes a telematics system 150 communicably coupled to a telematics platform 110, which is communicably coupled to a telematics unit 125 (e.g., telematics box, telematics communications unit, etc.) of a vehicle 120. The telematics unit 125 is communicably coupled to a control system 130 in the vehicle 120. As shown, the telematics environment 100 includes a plurality of vehicles 120 with a plurality of telematics platforms 110.

The telematics platform 110 is structured as a remote support device for the telematics unit 125. In this regard, the telematics platform 110 may include one or more servers, computers, processing systems, and the like. The telematics platform 110 communicates with the telematics unit 125 over a network. The network may be any type of communication protocol that facilitates the exchange of information between and telematics system 150, the telematics platform 110, and the telematics unit 125. In one embodiment, the network may be configured as a wireless network. In this regard, the vehicle 120 may wireless transmit data to and via the remote telematics platform 110 to the telematics system 150. The wireless network may be any type of wireless network, such as Wi-Fi, WiMax, Internet, Radio, Bluetooth, Zigbee, satellite, radio, Cellular, Global System for Mobile Communications (GSM), General Packet Radio Service (GPRS), Long Term Evolution (LTE), etc. In another embodiment, the network may be configured as a wired network or a combination of wired and wireless protocol. For example, the telematics unit 125 may electrically couple via fiber optic cable to the network to transmit data wirelessly to the platform 110 and, eventually, the telematics system 150.

As shown, the telematics environment 100 includes a plurality of telematics platforms 110. In this regard, each telematics unit 125 may be supported by a particular or specific telematics platform 110. For example, Manufacturer A produces telematics units that are only communicably coupled to Manufacturer A's particular platform. Accordingly, each manufacturer may have its own platform for communicating with its own telematics unit. In this regard, the telematics system 150 is structured to communicate with each platform 110 to establish a communication session with each particular telematics unit. In other embodiments, the telematics units manufacturers may only produce the telematics unit and give the end customer free reign with which to select their communication protocol and end destination for the data acquired by the telematics unit. In this configuration, the telematics platform 110 may be excluded from the environment 100.

For each vehicle 120, the telematics unit 125 is communicably coupled to each of the associated telematics platform 110 and the control system 130 of the vehicle 120. The telematics unit 125 may be structured as any type of telematics control unit. Accordingly, the telematics unit 125 may include, but is not limited to, a location positioning system (e.g., global positioning system) to track the location of the vehicle (e.g., latitude and longitude data, elevation data, etc.), one or more memory devices for storing the tracked data, one or more electronic processing units for processing the tracked data, and a communications interface for facilitating the exchange of data between the telematics unit 125 and the platform 110 (e.g., a modem). In this regard, the communications interface may be configured as any type of mobile communications interface or protocol including, but not limited to, Wi-Fi, WiMax, Internet, Radio, Bluetooth, Zigbee, satellite, radio, Cellular, GSM, GPRS, LTE, and the like. The telematics unit 125 may also include a communications interface for communicating with the control system 130 of the vehicle 120. The communication interface for communicating with the control system 130 may include any type and number of wired and wireless protocols (e.g., any standard under IEEE 802, etc.). For example, a wired connection may include a serial cable, a fiber optic cable, an SAE J1939 bus, a CAT5 cable, or any other form of wired connection. In comparison, a wireless connection may include the Internet, Wi-Fi, Bluetooth, Zigbee, cellular, radio, etc. In one embodiment, a controller area network (CAN) bus including any number of wired and wireless connections provides the exchange of signals, information, and/or data between the control system 130 and the telematics unit 125. In other embodiments, a local area network (LAN), a wide area network (WAN), or an external computer (for example, through the Internet using an Internet Service Provider) may provide, facilitate, and support communication between the telematics unit 125 and the control system 130. In still another embodiment, the communication between the telematics unit 125 and the control system 130 is via the unified diagnostic services (UDS) protocol. All such variations are intended to fall within the spirit and scope of the present disclosure.

The control system 130 may include any type of control system included in a vehicle including, but not limited to, an engine control module, a powertrain control module, a transmission control module, an aftreatment system control module, and/or a combination therewith. In this regard, the control system 130 may provide commands and/or instructions to one or more actuators within the vehicle 120 (e.g., timing and quantity of fuel injected, exhaust gas recirculation percentage, turbo-compressor speed, etc.). Further, the control system 130 is also structured to receive, acquire, and/or interpret data from one or more components in the vehicle 120. As such, the control system 130 may be communicably coupled to one or more sensors included with the vehicle. For example, the control system 130 may receive engine speed and engine torque data from each of an engine speed sensor and an engine torque sensor, respectively. For tracking, compartmentalization, and analytics, each piece of data may correspond with a data identifier (DIDs) (e.g., a code, value, etc.). The control system 130 may also receive data from an on-board diagnostics system (e.g., OBD II, OBD I, EOBD, JOBD, etc.). As such, the control system 130 may receive diagnostic trouble codes (DTCs) based on one or more operating characteristics of a component in the vehicle 120. The DTCs may include fault codes, parameter IDs, etc.

With the foregoing in mind, operation of the environment 100 may be described as follows. The control system 130 receives data from one or more vehicle 120 components. The data is provided to the telematics unit 125, which provides the data to the telematics platform 110. The telematics platform 110 selectively provides the data to the telematics system 150. Providing the data from the platform 110 to the system 150 may be based on one or more agreements (e.g., contracts) or the like. Beneficially, the telematics unit 125 and platform 110 provide a mobile communication network for the vehicle 120 to enable operators of the telematics system 150 to acquire data that would otherwise only be available if the vehicle 120 was brought into a data downloading location (e.g., a service center, etc.). However, as mentioned above, the telematics unit 125 and platform 110 are typically operated by a third-party relative to the producers or manufacturers of various components of the vehicle 120, such as the engine. Accordingly, because in one embodiment the telematics system 150 is operated by the producer or manufacturer of one or more components of the vehicle 120, such as the engine or control system 130, the operator or producer of the control system 130 may not include functionality to permit the transmission of private or proprietary data to the telematics platform 110.

According to the present disclosure, the telematics system 150 can be structured to facilitate the exchange of both public data and private data from the control system 130 to the telematics system 150 via the telematics unit 125 and telematics platform 110. The phrases "private data" and "public data" are meant to be broadly interpreted and generally refer to classifications of data acquired by the control system 130. "Public data" refers to any non-confidential or proprietary piece of data, where confidential or proprietary designations may be preset or predefined by, e.g., a producer of the control system 130 or other components within the vehicle 120. Comparatively, "private data" refers to any confidential or propriety piece of data. Accordingly, public data may include, but is not limited to, predefined data points, broadcast parameters, DTCs, etc. Private data may include, but is not limited to, engineering parameters, DIDs, machine-readable code, etc.

Figure 2:
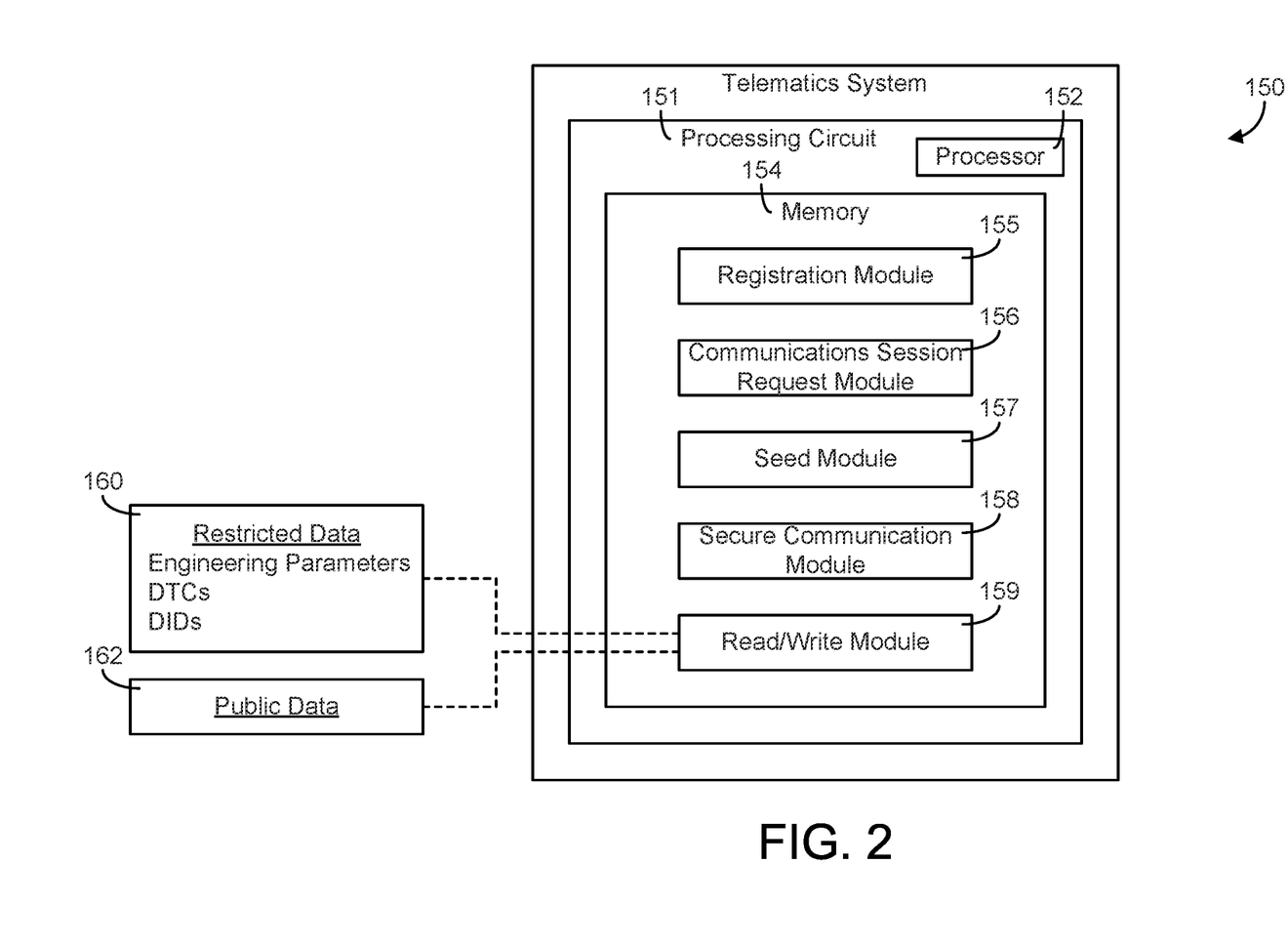
FIG. 2 is a schematic diagram of the telematics system of FIG. 1, according to an example embodiment.

With the general description of the telematics system 150 above in mind, an example structure of the telematics system is shown in FIG. 2 according to one embodiment. The telematics system 150 may also be referred to as a controller herein and is shown to include a processing circuit 151 including a processor 152 and a memory 154. The processor 152 may be implemented as a general-purpose processor, an application specific integrated circuit (ASIC), one or more field programmable gate arrays (FPGAs), a digital signal processor (DSP), a group of processing components, or other suitable electronic processing components. The one or more memory devices 154 (e.g., RAM, ROM, Flash Memory, hard disk storage, etc.) may store data and/or computer code for facilitating the various processes described herein. Thus, the one or more memory devices 154 may be communicably connected to the processor 152 and provide computer code or instructions to the processor 152 for executing the processes described in regard to the telematics system 150 herein. Moreover, the one or more memory devices 154 may be or include tangible, non-transient volatile memory or non-volatile memory. Accordingly, the one or more memory devices 154 may include database components, object code components, script components, or any other type of information structure for supporting the various activities and information structures described herein.

In one embodiment, the telematics system 150 is structured as one or more servers that provide a cloud computing paradigm (e.g., where data and applications are stored/run by a remote server but accessed by a user or operator via a network interface). The cloud-based system enables the storage of large amounts of data that would otherwise be prohibited if attempted to be stored on a local computing device. Further, the cloud-based implementation enables operators of the telematics system 150 to access the data and/or applications from a variety of geographical locations and facilitates multi-user access. In this configuration, the telematics system 150 may include one or more input/output devices that enable an operator(s) to control the telematics system 150. Further, due to the configuration, the telematics system 150 may also be operated by customers of the telematics system. As such, the one or more input/output devices may include, but are not limited to, a computer, a mobile phone, a mobile watch, a tablet computer, and the like.

Referring more particularly to FIG. 2, the memory 154 is shown to include various modules for completing the activities described herein. More particularly, the memory 154 includes a registration module 155, a communications session request module 156, a seed module 157, a secure communication module 158, and a read/write module 159. The modules are configured to establish and maintain a secure or encrypted bi-directional communication exchange between the telematics system 150 and the control system 130 via the telematics unit 125 and telematics platform 110 with respect to one or more pieces of public and private data. While various modules with particular functionality are shown in FIG. 2, it should be understood that the telematics system 150 and memory 154 may include any number of modules for completing the functions described herein. For example, the activities of multiple modules may be combined as a single module, as additional modules with additional functionality may be included, etc. Further, it should be understood that the telematics system 150 may further control other vehicle activity beyond the scope of the present disclosure.

Certain operations of the telematics system 150 described herein include operations to interpret and/or to determine one or more parameters. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a computer generated parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

The registration module 155 is structured to receive and store registration data regarding a telematics unit 125. The registration data may include, but is not limited to, an identity of the telematics provider, an engine serial number (or other vehicle component(s) used with a particular telematics unit), a control system identifier, a telematics unit number, a customer reference, and the like. Upon registering, the registration module 155 generates a record (e.g., file, etc.) for each particular system registration (i.e., telematics unit and control system, telematics unit and the associated engine, telematics unit and the associated other vehicle component, etc.) which can be stored in a repository (e.g., registration database, etc.). The record may also include associated privilege(s) with the registered system. In this regard, access/operation of the telematics system 150 is provided to customers thereof. The privileges refer to what functions or capabilities of the telematics system 150 that the customer(s) purchased or is otherwise allowed to receive/do (e.g., an ability to receive private data and the type of private data, an ability to write routines or processes to the control system 130, etc.) via the telematics system 150. This functionality is explained further in regard to the seed module 157 and the secure communication module 158 herein.

The communications session request module 156 is structured to provide a learn request to the telematics unit 125. The learn request initiates the communication session (also referred to as a "telematics session") between the telematics unit 125 and the control system 130. In other embodiments, the learning request may come from the telematics unit 125 itself, without a prompt or instruction from the telematics system 150. The learning request may include any type of prompt that initiates the telematics session.

The seed module 157 is structured to receive a code from the control system 130 via the telematics unit 125. In one embodiment, the code is encrypted while in another embodiment, the code may not be encrypted. The code (e.g., value, etc.) is randomly generated by the control system 130 and/or unique to the control system 130. In one embodiment, the code is structured as an encrypted or non-encrypted SEED (or seed). The SEED may have any structure and definition associated with SEEDs (e.g., seed states, random seeds, etc.) used in cryptography and, more particularly, in computer security cryptography. The SEED can include information regarding the control system 130 (e.g., serial number, model number, etc.) that can be used to authenticate the registered unit.

In that regard and responsive to reception of the code, the seed module 157 is structured to authenticate the code. Authentication includes validating whether the code is associated with a valid customer, valid telematics box, valid telematics provider, etc. Authentication may require an affirmative operator input (e.g., a human operator explicitly acknowledging that the encrypted code is valid). In other embodiments, authentication may be automated where the seed module 157 references one or more databases (e.g., a look-up table, etc.) to validate the code. In regard to the registration module 155, the SEED or code includes data that is cross-referenced with the registration information or data stored in a record of the repository (e.g., does the telematics unit identity correspond with the registered telematics unit identity for this engine (or other component of the vehicle 120). If validated, the associated privileges for this particular customer are recalled from the associated record, which are utilized by the secure communication module 158.

If the communication is unable to be validated (e.g., due to a lack of registration by the customer, or because the telematics unit is stolen and does not correspond with the particular engine, etc.), then the telematics system 150 may alert the telematics platform 110 to cease data exchange. The telematics system 150 may also provide an alert to an operator of the telematics system 150 for further investigation. In this case, the operator may include the customer and/or the operator of the telematics system 150.

Based on a successful authentication, the secure communication module 158 generates an encrypted key that is provided back to the control system 130 via the telematics unit 125. The encrypted key is based on the privileges (e.g., rights, capabilities, etc.) corresponding with the particular record associated with the registered control system 130 and telematics unit 125. The privileges may include, but are not limited to, a type of restricted data 160 that may be read and/or written, a diagnostic capability (e.g., an ability for a diagnostic process such as a diesel particulate filter regeneration process to be executed via the telematics system 150, etc.), a duration for the telematics session, etc. In certain embodiments, the customer of the telematics system 150 must purchase or otherwise be given access to certain privileges (e.g., an ability to run diagnostic procedures may cost more than an ability to read public data, etc.). In this regard, different customers of the telematics system 150 may have different privileges or capabilities. In one embodiment, the privilege or capability of definition may be adjusted dynamically (e.g., a customer may purchase additional functionality post-registration if additional capabilities are desired). Thus, the encrypted key may be changed dynamically responsive to the desires of a permitted user of the telematics system 150 (or a piece of the telematics system 150).

As mentioned above, the privilege data defines the encrypted key that is generated by the secure communications module 158. In one embodiment, the secure communications module 158 is structured to generate and provide a first key and a second key. The first key is for the telematics unit 125 to keep for itself, to be used in future secure communications sessions, while the other or second key is for the control system 130. In this configuration, only the telematics system 150 and the control system 130 know how to decrypt the second key. In this regard and still in this example configuration, the second key contains the first key information as well as all (or mostly all) the privileges defined by the record associated with the successful authentication. In this regard and as an example, the second key can define when the duration of the telematics session ceases. In another example, the second encrypted key provides an encryption vehicle for both public and private data (defined by the privileges) that are provided to the telematics system 150. Thus, this encrypted second key prevents or substantially prevents the telematics provider from examining certain data which, therefore, establishes a secure and encrypted communication channel for data between the telematics system 150 and the control system 130 via the telematics unit 125.

Upon validation of the encrypted key from the control system 130, a telematics session providing for the exchange of proprietary information via from the control system 130 via a third party's device (e.g., the telematics unit 125) to the telematics system 150 is established, which is also referred to as a proprietary data communication channel herein. Advantageously, proprietary or private data 160, such as engineering parameters, diagnostic trouble codes, data identifiers, and the like, may be transmitted through the telematics unit 125 with little risk of discovery by the telematics provider or a hacking entity. In this regard, reverse engineering based on the engineering parameters contained in the private data may be greatly reduced and the proprietary data is substantially ensured to remain proprietary. Public data 162 that may be available to the telematics provider may, however, be examined.

Based on the privileges defined in the record corresponding to the validated or authenticated control system-telematics unit system, the read/write module 159 is structured to enable, facilitate, or provide a user or customer of the telematics system 150 or an operator thereof the ability to read and/or write certain values, commands, data, information, etc. to the control system 130 remotely through the telematics environment. Beneficially, customers or operators of the telematics system 150 may avoid physical interaction with the vehicle 120 and control system 130 to impart desired structure and functionality to the control system 130. For example, based on the allowed privilege, an operator of the telematics system 150 may acquire engineering parameters regarding the engine to remotely troubleshoot the engine. In another example, the operator may write a diagnostic process to the control system 130. In still another example, the operator may read the diagnostic trouble codes received for a certain duration of time to troubleshoot the vehicle in general.

Thus, the registration module 155, communications session request module 156, seed module 157, and secure communication 158 provide dynamic authentication of the telematics unit 125. According to the present disclosure, the SEED may be randomly generated and responsive to a communications session request, while the encrypted key is in response to validation of the information included in the SEED. Therefore, the telematics system 150 is not cross-referencing hard coded keys in the control system 130. If this were case, identification of the telematics unit installed with the control system 130 is unknown because the telematics unit 125 is typically installed as an after-market enhancement. Further, the telematics system 150 would require a large and complex database for each hard coded key, which would occupy significant amounts of memory. Accordingly, the telematics system 150 of the present disclosure uses a dynamic authentication process based on registration of the telematics unit and validation of the learn request via the SEED (e.g., cross-referencing the information contained in the seed with that from the registration). This type of dynamic authentication alleviates the need for hard coded keys, provides modularity with respect to each telematics unit and control system (e.g., registration and de-registration may occur following each unit replacement or re-arrangement), provides long-term adaptability with respect to authentication of various telematics unit-control system arrangements, and eliminates or substantially eliminates a one-time hacking process where the hacker could gain access to the control system via knowledge of the hard coded key.

Another feature of the telematics system 150 is that the secure communication module 158 is structured to recognize dissociation between a telematics unit and one or more registered components. For example, if the telematics unit is registered with a particular engine and at some point in the future, the telematics unit is attempted to be registered with another different engine, the secure communication module 158 may provide an alert or notification to an operator of the telematics system 150, third party controller, etc. This capability could represent an anti-theft capability and/or trigger an update to the database of registered components. Another response to attempting to establish a telematics communication session with an unregistered telematics unit and vehicle component may be a command to automatically expire the encrypted key. Further, the reverse operation may also trigger a cancelling of the telematics session or an expiration of the key: e.g., the telematics unit remains installed with the vehicle but the vehicle receives a new control system (or another component). Because the new component(s) was not previously registered with that particular telematics unit, the secure communication module 158 may provide a command to automatically expire the key to terminate the telematics communication session. In this regard, different components that become replaced relative to an intact telematics unit may trigger different responses. For example, any time a part of the engine or exhaust aftertreatment system is replaced, then cancellation of the key occurs. However, if an air filter (or any other deemed component) is replaced, the response may be no response and the telematics session continues. Still another response to attempting to establish a telematics communication session with an unregistered telematics unit and component may be an option to update a registration database of the registration module 155. For example, a prompt may be provided for confirmation or non-confirmation that the particular telematics unit should not be associated with a particular component of the vehicle. This capability may facilitate automatic or semi-automatic registering of different components with a particular telematics unit. Of course, one or more levels of security may be utilized to ensure or substantially ensure that the particular telematics unit is associated with one or more valid components (e.g., purchased components, etc.). As such and readily appreciated, there may be a wide range of configurability employed here.

Still another feature of the telematics system 150 includes the definition of the expiration of the duration in real time (e.g., 3 months, etc.) or run time (e.g., 100 hundred hours of transmission of data from the telematics unit 125). That is to say, other embodiments may include the expiration of the key. This expiration may function as an anti-hacking feature for the telematics system 150 because there is time-constrained use of the telematics system 150 and environment 100. Still another feature of the telematics system 150 includes another anti-hacking capability. For example, if the duration is 3-months and the person tries to run the clock backward or disconnect power to discard accumulated time to gain additional use of the system, the telematics system 150 receives a notification and stops transmission of the data, in addition to the control system 130 expiring the key. In this regard, there is an anti-hacking feature.

Figure 3:
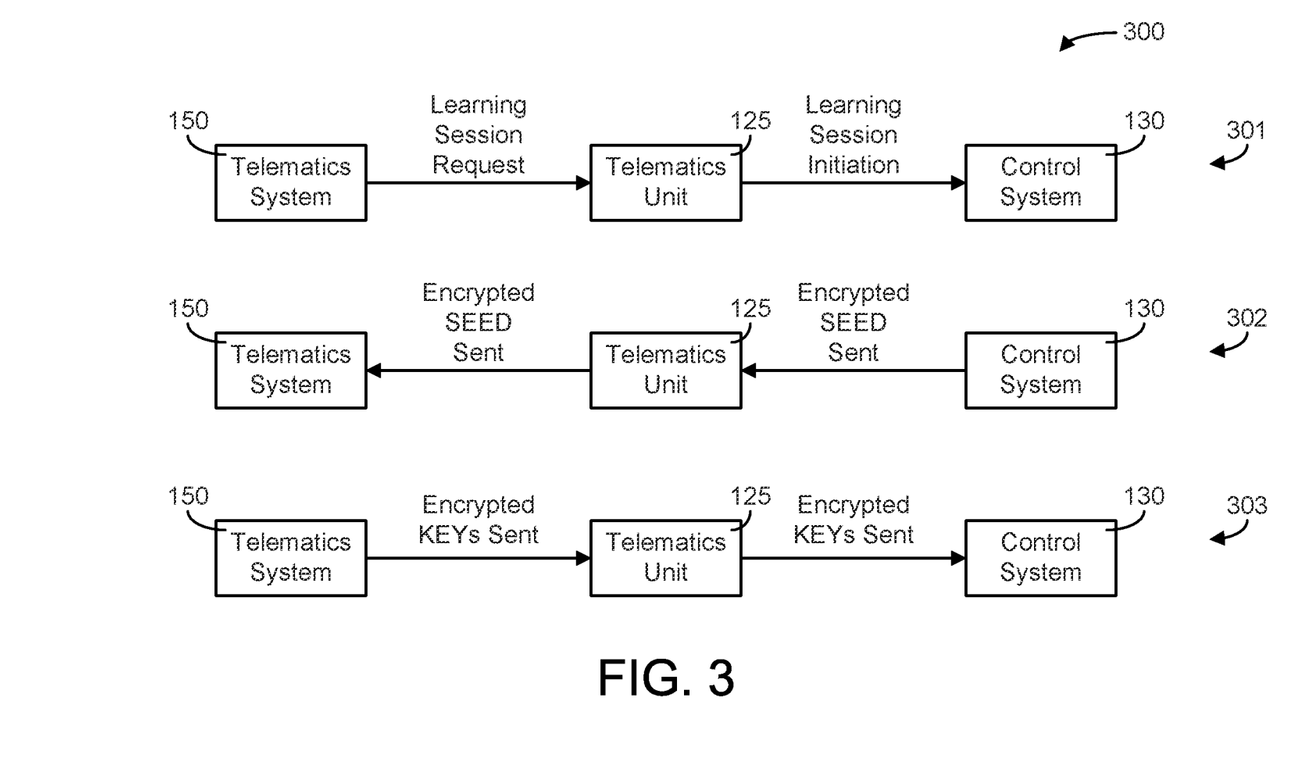
FIG. 3 is a schematic diagram of a learning session for a telematics communication session, according to an example embodiment.

Referring now to FIG. 3 in connection with FIGS. 1-2, a schematic diagram 300 of a learning session for a telematics communication session is shown according to one embodiment. At schematic 301, a learning session request is provided from the telematics system 150 to the telematics unit 125 to the control system 130. At schematic 302, responsive to the learning session request (i.e., telematics communication session request), an encrypted or, in certain embodiments, unencrypted SEED is sent to the telematics unit 125 to the telematics system 150. The SEED includes information pertaining to the control system 130, which may be used by information associated with the telematics unit 125 by the telematics system 150 to validate or authenticate the telematics unit 125—control system 130 system. Based on a successful validation, the telematics system 150 generates and provides encrypted keys to the telematics unit 125, which in turn are passed to the control system 130 (schematic 303). The encrypted keys correspond with and are based on the information contained in the SEED. Accordingly, the encrypted keys define the privileges that the control system 130 provides the telematics unit 125 (e.g., the duration of communication between the units and telematics system 150, etc.). Upon validation of the keys by the control system 130, a secure communication channel between the telematics system 150 and control system 130 via the telematics unit 125 may be established to permit a secure transmission of proprietary data via a third party unit (i.e., the telematics unit 125).

Figure 4:
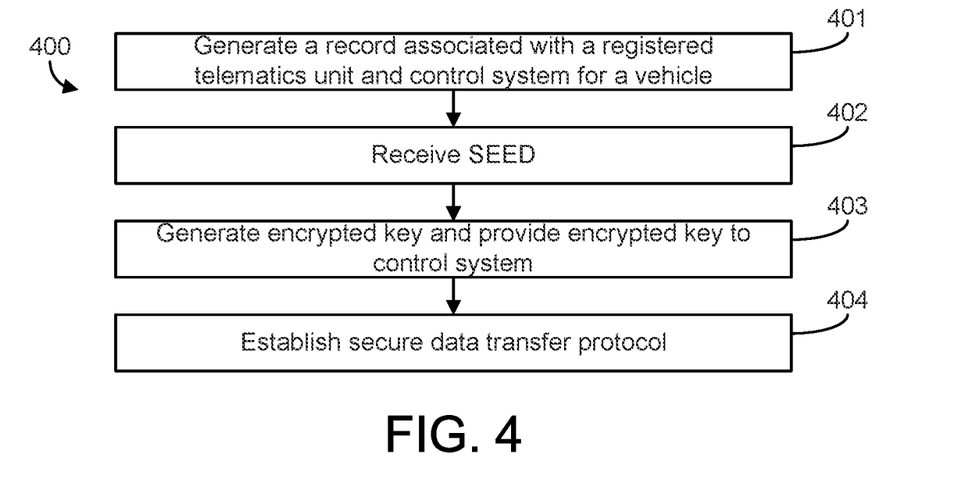
FIG. 4 is a flowchart of a method of establishing a secure telematics communication session, according to an example embodiment.

Based on the above, an example method for establishing a secure telematics communication session is shown in FIG. 4 according to one embodiment. As the operations of process 400 may be implemented by one or more modules of the telematics system 150, reference may be made to components of FIGS. 1-2 to aid description of process 400.

At process 401, a record associated with a registered telematics unit-control system for a vehicle is generated. In other embodiments, the registration may be based on a telematics unit and engine combination. In still other embodiments, the registration may be based on a telematics unit and another component of the vehicle combination. All such variations are intended to fall within the spirit and scope of the present disclosure. The record may be stored in a repository of the telematics system and used to authenticate future communications from the telematics system. At process 402, a SEED is received. The SEED can be generated via the control system 130 responsive to a learn request. The SEED includes identifying information regarding the control system 130 that may be used to authenticate the telematics unit-control system by the telematics system 150. Responsive to the SEED, an encrypted key is generated and provided by the telematics system 150 via the telematics unit 125 to the control system 130 (process 403). In one embodiment, the encrypted key includes a first key and a second key as described above. The first key is received by the telematics unit while the second key is received by the control system 130, wherein the second key includes the first key information and defines the privileges or capabilities of the telematics system, telematics unit, and control system (e.g., duration of telematics session, type and frequency of data provided to the telematics system, etc.). Upon verification of the encrypted key by the control system 130, a secure data transfer protocol is established at process 404.

The secure data transfer protocol is established between the telematics system 150 and the control system 130 via the telematics unit 125. In this regard, both proprietary and public data may be sent via the telematics unit 125 using the encrypted second key that selectively restricts access by, e.g., the telematics unit provider to data included in the encrypted second key.

In certain embodiments, the method may further include read and/or write capabilities based upon the privileges defined in the record. The read and/or write capabilities may allow a remote operator to control one or more functions of the control system 130 wirelessly or remotely via the telematics environment.

It should be understood that no claim element herein is to be construed under the provisions of 35 U.S.C. § 112, sixth paragraph, unless the element is expressly recited using the phrase "means for."

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

Example and non-limiting module implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

The schematic flow chart diagrams and method schematic diagrams described above are generally set forth as logical flow chart diagrams. As such, the depicted order and labeled steps are indicative of representative embodiments. Other steps, orderings and methods may be conceived that are equivalent in function, logic, or effect to one or more steps, or portions thereof, of the methods illustrated in the schematic diagrams.

Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in machine-readable medium for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in machine-readable medium (or computer-readable medium), the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone computer-readable package, partly on the user's computer and partly on a remote computer or entirely on the remote computer or server.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed:

1. An apparatus, comprising:
a processing circuit that executes:
  a registration module structured to receive registration information regarding a telematics unit and a control system for a piece of equipment;
  a seed module structured to receive seed information from the control system via the telematics unit responsive to a reception of a telematics session request by the control system, wherein the seed module is structured to authenticate the telematics unit and the control system for the piece of equipment based on the seed information received by the seed module and the registration information; and a secure communication module structured to:
  generate a first encrypted key and a second encrypted key responsive to the authentication; and
  provide the first encrypted key to the telematics unit and the second encrypted key to the control system via the telematics unit to establish a data communication channel from the control system to the apparatus via the telematics unit
  recognize an unregistered component of the first piece of equipment associating with the telematics unit of the first piece of equipment; and
  in response, terminate the data communication channel, provide a notification to an operator of the control system, or update a registration database associated with the control system.

2. The apparatus of claim 1, wherein proprietary data is encrypted using the second encryption key and transmitted via the telematics unit to the apparatus.

3. The apparatus of claim 1, wherein the second encryption key defines an access privilege associated with the authenticated telematics unit and control system.

4. The apparatus of claim 3, wherein the access privilege includes at least one of an ability to read at least one predefined type of proprietary data, to write data in the control system, or to execute a diagnostic process for the piece of equipment.

5. The apparatus of claim 1, wherein the second encrypted key defines a duration for the telematics session.

6. The apparatus of claim 1, wherein the second encrypted key includes an expiration duration, wherein the expiration duration defines a duration of the data communication channel.

7. The apparatus of claim 1, wherein the piece of equipment includes at least one of:
  a power generator;
  a vehicle including at least one of an on-highway vehicle and an off-highway vehicle;
  a marine vessel;
  a piece of construction equipment;
  a piece of mining equipment; or
  a piece of oil and gas equipment.

8. The apparatus of claim 1, wherein the secure communication module is structured to:
  recognize an unregistered component of the piece of equipment associating with the telematics unit; and
  in response, terminate the proprietary data communication channel, provide a notification to an operator of the apparatus, or update a registration database associated with the apparatus.

9. A telematics system, comprising:
  a controller coupled to a plurality of telematics units associated with a plurality of pieces of equipment, the controller structured to:
  receive registration information regarding a respective telematics unit and control system for each equipment piece;
  receive seed information from a control system via a telematics unit of a first piece of equipment of the plurality of pieces of equipment responsive to receiving a telematics session request by the control system of the first piece of equipment;
  authenticate the telematics unit and the control system of the first piece of equipment based on the seed information received from the control system and the registration information;
  generate a first encrypted key and a second encrypted key based on the authentication;
  provide the first encrypted key to the telematics unit of the first piece of equipment; and
  provide the second encrypted key to the control system of the first piece of equipment via the telematics unit of the first piece of equipment to establish a data communication channel from the control system of the first piece of equipment to the controller via the telematics unit of the first piece of equipment;
  recognize an unregistered component of the first piece of equipment associating with the telematics unit of the first piece of equipment; and
  in response, terminate the data communication channel, provide a notification to an operator of the controller, or update a registration database associated with the controller.

10. The telematics system of claim 9, wherein the controller is structured to generate a repository of records of registration information for each piece of equipment with a registered telematics unit, wherein the controller is structured to cross-reference information received from the control system with each record in the repository to authenticate the telematics unit and the control system for the first piece of equipment.

11. The telematics system of claim 9, wherein the plurality of pieces of equipment includes at least one of:
  a power generator;
  a vehicle including at least one of an on-highway vehicle and an off-highway vehicle;
  a marine vessel;
  a piece of construction equipment;
  a piece of mining equipment; or
  a piece of oil and gas equipment.

12. The telematics system of claim 9, wherein the seed information received from the control system includes at least one of randomly generated and unique to the control system of the first piece of equipment.

13. The telematics system of claim 9, wherein the second encrypted key defines an access privilege associated with the authenticated telematics unit and the control system of the first piece of equipment.

14. A method, comprising:
  receiving, by a processing circuit, for each piece of equipment of a plurality of pieces of equipment, registration information regarding a respective telematics unit and a respective control system of each piece of equipment of the plurality of pieces of equipment;
  receiving, by the processing circuit, seed information from a control system of a first piece of equipment of the plurality of pieces of equipment via a telematics unit of the first piece of equipment responsive to receiving a telematics session request by the control system of the first piece of equipment;
  authenticating, by the processing circuit, the telematics unit and the control system of the first piece of equipment based on the seed information received from the control system and the registration information;
  generating, by the processing circuit, a first encrypted key and a second encrypted key based on the authentication;
  providing, by the processing circuit, the first key to the telematics unit of the first piece of equipment; and
providing, by the processing circuit, the second encrypted key to the control system of the first piece of equipment via the telematics unit of the first piece of equipment to establish a data communication channel from the control system of the first piece of equipment to the processing circuit via the telematics unit of the first piece of equipment.

15. The method of claim 14, wherein the second encrypted key defines an access privilege associated with the authenticated telematics unit and the control system of the first piece of equipment.

16. The method of claim 15, wherein the access privilege includes at least one of an ability to read at least one predefined type of proprietary data, to write data in the control system, or to execute a diagnostic process for the vehicle.

17. The method of claim 14, wherein the second encrypted key defines a duration for the telematics session.

18. The method of claim 14, wherein the second encrypted key includes an expiration duration, wherein the expiration duration defines a duration of the data communication channel.

19. The method of claim 14, wherein the plurality of pieces of equipment includes at least one of:
 a power generator;
 a vehicle including at least one of an on-highway vehicle and an off-highway vehicle;
 a marine vessel;
 a piece of construction equipment;
 a piece of mining equipment; or
 a piece of oil and gas equipment.

20. The method of claim 14, further comprising:
 recognizing, by the processing circuit, an unregistered component of the first piece of equipment associating with the telematics unit of the first piece of equipment; and
 in response to recognizing the unregistered component associating with the telematics unit of the first piece of equipment, terminating the data communication channel, providing a notification, or updating a registration database.

\* \* \* \* \*